United States Patent Office 3,532,726
Patented Oct. 6, 1970

---

3,532,726
ACYLOXY MERCURY-SUBSTITUTED ORGANOSILICON COMPOUNDS
Richard V. Viventi, Schenectady, N.Y., assignor to General Electric Company, a corporation of New York
No Drawing. Filed Oct. 30, 1967, Ser. No. 679,198
Int. Cl. C07f 3/10; C11c 1/00
U.S. Cl. 260—431      4 Claims

ABSTRACT OF THE DISCLOSURE

Acyloxy mercury-substituted silanes and siloxanes are prepared by reacting mercuric acylates, alkanols, and alpha-olefinically-unsaturated substituted organosilicon compounds to produce silanes and siloxanes characterized by the presence of silicon-bonded groups having the formula:

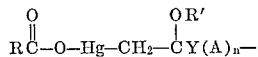

where R is an alkyl radical of from 1 to 17 carbon atoms R' is an alkyl radical of 1 to 3 carbon atoms, Y is hydrogen or methyl, A is a divalent alkylene radical or a divalent radical containing only carbon, hydrogen and oxygen atoms, and $n$ is a whole number equal to from 0 to 1, inclusive. Silanes and siloxanes of the type described are useful as fungicidal compositions and as additives to compositions requiring fungus resistance.

---

This invention relates to organosilicon compounds containing acyloxy mercury groups. In particular, this application is directed to organosilanes and organosiloxanes containing acyloxy mercury radicals attached to silicon through intervening groups.

Organopolysiloxane liquid and solid materials have found wide use in many applications where their unusual processability and combination of surface properties and chemical inertness and thermal stability have been advantageous. However, it has long been known that the various organosilicon compounds have not resisted the growth of fungus materials and, in fact, have apparently served as a stimulant to fungus growth in applications in which the silicone has been subjected to a moist environment. In order to obviate this problem, it has been proposed to add various fungicidal materials to organosilicon compounds. However, conventional materials of fungicidal activity have been relatively incompatible with the organopolysiloxanes and it has been impossible to obtain uniform compositions.

The present invention is based on my discovery of a class of organosilicon compounds containing fungicidal activity and which are quite compatible with other types of organosilicon compounds and can be mixed and blended therewith and even reacted therewith to provide organosilicon materials having conventional silicon properties and, in addition, fungus resistance.

The present invention is based on my discovery of a class of compositions consisting of silanes having the formula:

(1) 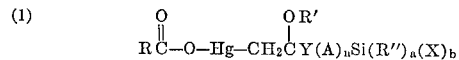

and organopolysiloxanes having the formula:

(2) 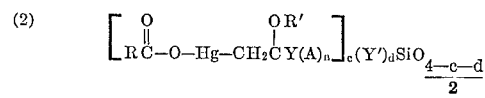

where R is an alkyl radical of from 1 to 17 carbon atoms; R' is an alkyl radical of 1 to 3 carbon atoms; A is a member selected from the class consisting of alkylene radicals having from 1 to 2 carbon atoms, and divalent radicals containing carbon, hydrogen, and oxygen only; R'' represents a monovalent hydrocarbon radical free of aliphatic unsaturation; Y is hydrogen or methyl, Y' is a member selected from the class consisting of monovalent hydrocarbon radicals and halogenated monovalent hydrocarbon radicals; X is a member selected from the class consisting of lower alkoxy radicals and acyloxy radicals containing up to 4 carbon atoms; $a$ is a whole number equal to from 0 to 2, inclusive; $b$ is an integer equal to from 1 to 3, inclusive; the sum of $a+b=3$; $c$ has a value of from 0.005 to 1.0, inclusive; $d$ has a value of from 0 to 2.20, inclusive; and the sum of $c$ plus $d$ is equal to from 1.0 to 2.25, inclusive; and $n$ is a whole number equal to from 0 to 1, inclusive.

The values of the various substituents in Formulas 1 and 2 are best understood by reference to the method of preparation of the compositions within the scope of the present invention, particularly the preparation of the silanes within the scope of Formula 1 which are prepared by reacting a three component mixture consisting of a mercuric diacylate having the formula:

(3) 

an alcohol having the formula:

(4) R'OH and an organosilicon compound containing an alpha-olefin group and having the formula:

(5) $CH_2=CY(A)_nSi(R'')_a(X)_b$ where R, R', R'', Y, A, X. $n$, $a$, and $b$ are as previously described.

The stoichiometry of the reaction requires one mole of the mercuric diacylate, two moles of the alcohol of Formula 4, and one mole of the unsaturated silane of Formula 5. The byproduct of the reaction is an ester having the formula:

(6) 

Illustrative of the mercuric acylates useful in the practice of the present invention, and thus of the R group in the various formulae, are mercuric acetate, mercuric propionate, mercuric decanoate, mercuric stearate, etc. The preferred acetate employed in the practice of the present invention is mercuric acetate. Illustrative of the alcohols within the scope of Formula 4 are the four possible alcohols, namely, methanol, ethanol, isopropanol, and propanol.

The alpha-olefinically unsaturated silane within the scope of Formula 5 is selected from a broad group of materials and can be any material within this group which, except for the unsaturated group, is relatively inert to the reactants under the conditions of the reaction. Illustrative of the various monovalent hydrocarbon radicals free of aliphatic unsaturation within the scope of R'' of Formula 5 are alkyl radicals, e.g., methyl, ethyl, propyl, butyl, octyl, octadecyl, etc. radicals; aryl radicals, e.g., particularly monocyclic aryl radicals, such as phenyl, xylyl, tolyl, etc. radicals; aralkyl radicals, e.g., benzyl, phenylethyl, etc. radicals; cycloalkyl radicals, e.g., cycloheptyl, cyclohexyl, etc. radicals; and preferably R'' is either methyl or phenyl, with the preferred specific group being methyl.

The groups represented by the radical X of Formula 5 are lower alkoxy radicals, by which is meant alkoxy radicals containing from 1 to 7 carbon atoms, such as methoxy, ethoxy, butoxy, heptoxy, etc., and acyloxy radicals which are derived from aliphatic monocarboxylic acids containing from 1 to 4 carbon atoms, including acids such as propionic, acetic, etc. The preferred specific radical represented by X of Formula 5 is the methoxy radical.

The alpha-olefinically unsaturated silicon-bonded radical in the silane of Formula 5 includes the vinyl radical which is obtained when subscript $n$ is equal to 0 and Y is hydrogen, as well as other hydrocarbon radicals obtained when $n$ is equal to 1 and A is one of the specified classes of alkylene radicals. In particular, the hydrocarbon radicals attached to silicon which contain alpha-olefin aside from vinyl are the allyl radical and the alpha-butylene radical. When A of Formula 5 is a radical containing carbon, hydrogen, and oxygen, the silicon-bonded alpha-olefinically unsaturated group can be an ether group, a ketone group, or a carboxylic acid group. Thus, particular radicals within the scope of Formula 5 attached to the silicon include methacryloxypropyl, methoxyethyl, as well as the

radical.

From the foregoing description of the many substituents on the silicon atom of the alpha-olefinically unsaturated silane of Formula 5, it is seen that a vast number of radicals are within the scope of this material. Despite this, in the present invention there is a strong preference for the use of silanes in which $n$ is 0, in which R″ is methyl, in which Y is hydrogen, in which $a$ is 0 or 1, in which X is methoxy, and in which $b$ is 2 or 3. The preferred specific silane within the scope of Formula 5 is vinyltrimethoxysilane. The preferred alcohol employed in the practice of the present invention is methanol and when the preferred silane and the preferred alcohol are combined with the preferred mercuric acetate, the resulting product is the preferred product of the present invention, which is 2-(acetoxymercury)methoxyethyltrimethoxysilane which has the formula:

(7) 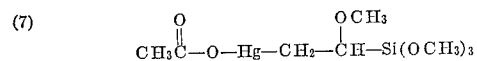

In forming the silanes of Formula 1, the mercuric acylate and the alpha-olefinically unsaturated silane are generally employed in equimolar amounts and the alcohol of Formula 4 is usually employed in a 50% to 100% stoichiometric excess. Since the reaction involves two moles of the alcohol per mole of each of the other reactants, this 50% to 100% excess amounts to the use of 3 to 4 moles of the alcohol per mole of each of the other reactants. While it is possible to conduct the reaction in the presence of a solvent which is inert to the reactants under the conditions of the reaction, it has been found that the use of an additional solvent in the reaction mixture of the present reaction is unnecessary. The alcohol and the alpha-olefinically unsaturated silane are liquid materials and, while the mercuric acylates are sometimes solids, they dissolve readily in the other reactants and the reaction can be made to proceed smoothly without solvent.

To effect the reaction, the reactants are merely added to a reaction vessel and heated to an elevated temperature to distill from the reaction mixture the ester formed from the alcohol and the mercuric acylate and the excess alcohol. Generally, this distillation occurs at a temperature of from about 90 to 110° C. and this general range has been found satisfactory for effecting the reaction. Employing such temperatures, the reaction is completed in a time of from about 6 to 12 hours. After completion of the reaction, the reaction mixture is usually cooled and filtered and any low boiling materials are removed by subjecting the reaction product to a high vacuum at room temperature to provide the final product which is a liquid at room temperature. Of course, the particular temperature and times employed in effecting the reaction are a function of the particular reactants and selection of the proper reaction conditions is within the skill of the art.

The preparation of organopolysiloxanes within the scope of Formula 2 which contain the acyloxy mercury radical can be effected by one of two methods. In the first method, a hydrolyzable silane within the scope of Formula 1 is hydrolyzed and condensed alone or with one or more other hydrolyzable silane groups having the formula:

(8) 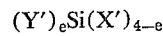

where Y′ is as previously defined and $e$ is an integer equal to from 1 to 3, inclusive, and X′ is a hydrolyzable group.

Illustrative of the radicals represented by Y′ of Formula 8 are monovalent hydrocarbon radicals, halogenated monovalent hydrocarbon radicals and cyanoalkyl radicals. Included within the scope of the monovalent hydrocarbon radicals are alkyl radicals, e.g., methyl, ethyl, propyl, butyl, octyl, octadecyl, etc. radicals; aryl radicals, e.g., phenyl, naphthyl, xylyl, tolyl, etc. radicals; aralkyl radicals, e.g., benzyl, phenylethyl, etc. radicals; cycloaliphatic radicals, e.g., cyclohexyl, cycloheptyl, cyclohexenyl, etc. radicals; alkenyl radicals, e.g., vinyl, alayl, etc. radicals; halogenated monovalent hydrocarbon radicals, e.g., chloromethyl, chlorophenyl, dichlorophenyl, trifluoromethylpropyl, bromophenyl, etc. radicals; cyanoalkyl radicals, e.g., beta-cyanoethyl, beta-cyanopropyl, gamma-cyanopropyl, etc. radicals. The hydrolyzable groups represented by X′ of Formula 8 are preferably lower alkoxy groups, and, in particular, methoxy or ethoxy.

The proportions of the silane of Formula 1 and the hydrolyzable silane of Formula 8 are selected so as to provide the proper ratio of silicon-bonded groups so as to provide a final polysiloxane within the scope of Formula 2. This type of hydrolysis and condensation is well known in the art and is well within the skill of the art without further direction.

A second method of forming the siloxanes within the scope of Formula 2 is to employ as a starting material an alpha-olefinically unsaturated siloxane having the formula:

(9) 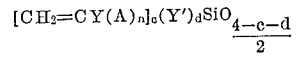

where A, Y, Y′, $c$, $d$, $n$, and the sum of $c$ plus $d$ are as previously defined. The unsaturated siloxane of Formula 9 is reacted with the mercuric acylate of Formula 3 and the alcohol of Formula 4 in the manner described above for the alpha-olefinically unsaturated silane to form the product within the scope of Formula 2.

Again, the proportions of reactants are selected to provide one mole of the mercuric acylate of Formula 3 per mole of silicon-bonded olefinically unsaturated groups in the siloxane of Formula 9 and per 3 to 4 moles of the alcohol of Formula 4. Again, the reaction is effected in the absence of solvent and is facilitated by heat, which distills from the reaction mixture the ester of Formula 6 and the unreacted excess alcohol of Formula 4. The time of the reaction and the reaction conditions are the same as the reaction conditions previously described with respect to the silane.

The following examples are illustrative of the practice of my invention and are not intended for purposes of limitation. All parts are by weight.

EXAMPLE 1

To a reaction vessel is added 74 g. (0.5 mole) vinyltrimethoxysilane, 159 g. (0.5 mole) mercuric acetate, and 48 g. (1.5 moles) methyl alcohol. The reaction mixture is stirred and heated at a temperature of from 90 to 110° C. during which time distillation of a mixture of methyl alcohol and methyl acetate begins. Twice during the course of the reaction, additional 4 g. portions of methanol are added to facilitate the distillation reaction. At the end of 14 hours, the reaction mixture is cooled and filtered. The reaction mixture is then stripped of remaining low boiling materials at room temperature and a pressure of 2.0 microns to produce the compound 2-(acetoxymercury)methoxyethyltrimethoxysilane which is described by Formula 7. This material is a clear, colorless lqiuid having a refractive index $n_D^{25}=1.5258$ and is identified by elemental analysis and infrared analysis. Elemental analysis shows the presence of 18.33% carbon, 3.55% hydrogen, 47.02% silicon, and 6.64% mercury as compared with the theoretical values of 21.9% carbon, 4.13% hydrogen, 45.4% silicon, and 6.70% mercury. Infrared analysis shows bands at 6.3 microns corresponding to the acetoxy group, at 3.5 and 8.4 microns corresponding to the methoxy silicon linkage, at 9.2 microns corresponding to the Si-O-C linkage and the C-O-C linkage' A band at 7.6 microns was tentatively correlated to the mercury methylene linkage. The fungicidal properties of the acetoxy mercury compound prepared in this example are evaluated in a room temperature vulcanizing silicone rubber composition of the type described in Pat. 2,843,555—Berridge. In particular, a base composition is prepared by mixing 100 parts by weight of a silanol chain-stopped polydimethylsiloxane having a viscosity of about 3,000 centistokes at 25° C., 20 parts finely divided diatomaceous earth, 20 parts zinc oxide, and 30 parts calcined clay. Finally, two parts of a liquid partial hydrolysis product of ethyl orthosilicate is added to the reaction mixture. To one portion of this composition is added 2% by weight dibutyl tin dilaurate and 0.05% by weight of the acetoxy mercury compound of this example. To another portion of the room temperature vulcanizing silicone rubber base material used as a control is added only the 2% by weight dibutyl tin dilurate. Both of these samples are cured in a ⅛" thick sheet and after curing at room temperature for 24 hours, 1" square are cut from each sample. A 1" square from each of the samples is placed in a petri dish containing a standard potato dextrose agar and each dish is then inoculated with the fungus *Aspergillus niger* in the same amount and each sample is allowed to incubate at 32° C. for 4 days. At the end of this time, the fungus has completely grown over the control which contains no acetoxy mercury derivative of this example, while a 5- to 6-centimeter zone of inhibition surrounds the sample of rubber containing the acetoxy mercury compound of the present invention.

EXAMPLE 2

To a reaction vessel was added 770 g. (1 mole) of mercuric stearate, 240 g. (4 moles) of isopropyl alcohol, and 3527 g. (1 mole) vinyl groups of a trimethylsilyl chain-stopped copolymer containing an average of 96 dimethylsiloxane units per molecule and 2 methylmethacryloxypropylsiloxane units per molecule. This reaction mixture was heated at a temperature which varied from 90 to 120° C. over a 24-hour period, then subjected to a vacuum of 0.4 micron, and cooled to room temperature to produce a siloxane fluid having the formula:

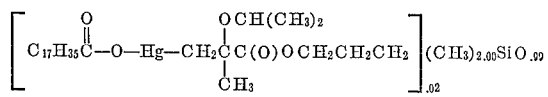

This material was a clear, colorless liquid which was useful as an additive to conventional methyl-silicone fluids useful in release applications, where the surfaces being released resisted fungus growth for an unusually long period of time.

While the foregoing examples have illustrated many of the embodiments of my invention, it should be understood that my invention relates broadly to the type of silanes and siloxanes set forth in Formulas 1 and 2 with the broad group of substituents permissible thereon. These compositions, in addition to their utility in the particular antifungicidal applications disclosed, are useful in many more environments where resistance to fungus growth is important, and thus these compositions provide a useful addition to the siloxane art. In addition to employing these materials as additives for organopolysiloxane compositions, it is apparent that these materials are also useful in applications where fungicidal resistance is required, even though the basic system is not a silicone system. For example, these materials are useful as additives for water repellent treatments of cloth, leather and other water-permeable materials where resistence to fungus or mildew are desirable. These treatments are used on tents, articles of clothing, footwear, tarpaulins, etc., to prevent the growth of mildew in tropical climates. Other uses of the silane and/or polysiloxane having fungicidal activity is in the treatment of aqueous slurries of paper pulp and on Fourdrinier type papermaking machines where the fungicidal activity prevents the buildup of slime on the copper screens.

What I claim as new and desire to secure by Letters Patent of the United States is:

1. An organosilicon compound selected from the class consisting of silanes having the formula:

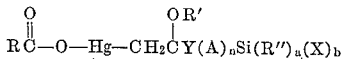

and siloxanes having the formula:

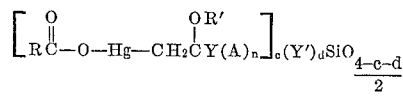

where R is an alkyl radical of from 1 to 17 carbon atoms, R' is an alkyl radical of 1 to 3 carbon atoms, R" is a monovalent hydrocarbon radical free of aliphatic unsaturation, A is a divalent radical selected from the class consisting of alkylene radicals having up to 2 carbon atoms and divalent aliphatic radicals consisting of carbon, hydrogen, and oxygen only; Y is a member selected from the class consisting of hydrogen and methyl; Y' represents a monovalent hydrocarbon radical, X is a member selected from the class consisting of lower alkoxy radicals and aliphatic monoacyl radicals having from 1 to 4 carbon atoms, $a$ is a whole number equal to from 0 to 2, inclusive; $b$ is a whole number equal to from 1 to 3, inclusive; the sum of $a+b=3$; $c$ has a value of from 0.005 to 1.0, inclusive; $d$ has a value of from 0 to 2.2, inclusive; the sum of $c$ plus $d$ is equal to from 1.05 to 2.25, inclusive; and $n$ is a whole number equal to from 0 to 1, inclusive.

2. The organosilicon compound of claim 1 which is a silane.

3. An organosilicon compound of claim 1 which is a siloxane.

4. An organosilicon compound within the scope of claim 1 having the formula:

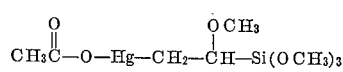

References Cited

UNITED STATES PATENTS 2,066,367   1/1937   Schönhöfer et al. _____ 260—431
3,061,424   10/1962  Nitzsche et al. ____ 260—431 XR

FOREIGN PATENTS 281,374   5/1964   Australia.

OTHER REFERENCES

Seyferth et al.: L. Naturf, B14B, pp. 137–139 (1959).

TOBIAS E. LEVOW, Primary Examiner

H. M. S. SNEED, Assistant Examiner

U.S. Cl. X.R.

117—138.5, 142; 162—79; 252—8.6; 260—46.5, 414, 434, 814